US007931436B2

(12) United States Patent
Dobek, Jr. et al.

(10) Patent No.: US 7,931,436 B2
(45) Date of Patent: Apr. 26, 2011

(54) ROLLER BEARINGS, AND STRUTS AND GAS TURBINE ENGINES HAVING SUCH BEARINGS

(75) Inventors: Louis J. Dobek, Jr., Somers, CT (US); David M. Daley, Manchester, CT (US)

(73) Assignee: United Technologies Corp., Hartford, CT (US)

( * ) Notice: Subject to any disclaimer, the term of this patent is extended or adjusted under 35 U.S.C. 154(b) by 892 days.

(21) Appl. No.: 11/853,959

(22) Filed: Sep. 12, 2007

(65) Prior Publication Data

US 2009/0067985 A1 Mar. 12, 2009

(51) Int. Cl.
*F03B 11/02* (2006.01)

(52) U.S. Cl. ..................... 415/104; 415/107; 415/170.1; 415/229; 384/492; 384/565; 384/907.1; 384/912

(58) Field of Classification Search .................. 415/104, 415/107, 137, 170.1, 229; 384/492, 491, 384/565, 907.1, 912

See application file for complete search history.

(56) References Cited

U.S. PATENT DOCUMENTS 4,245,951 A * 1/1981 Minnich ....................... 415/139
4,311,004 A * 1/1982 du Pont ........................... 60/775
5,593,234 A * 1/1997 Liston ........................... 384/492
5,735,612 A 4/1998 Fox et al.
5,906,691 A 5/1999 Burnett et al.
6,082,959 A 7/2000 Van Duyn
6,261,061 B1 * 7/2001 Pfaffenberger ............... 415/229
6,464,401 B1 10/2002 Allard
6,517,249 B1 2/2003 Doll
6,655,845 B1 * 12/2003 Pope et al. .................... 384/492
6,682,224 B2 1/2004 Ooitsu et al.
6,869,222 B1 3/2005 Okita et al.
6,905,250 B2 6/2005 Lynch et al.
7,104,699 B2 9/2006 Shattuck et al.
7,201,558 B2 4/2007 Norris et al.
7,240,872 B2 7/2007 Inoguchi et al.
7,703,290 B2 * 4/2010 Bladon et al. ................... 60/804
7,748,952 B1 * 7/2010 Schopf et al. ................. 415/116
2005/0047694 A1 3/2005 Nozaki et al.
2006/0251508 A1 11/2006 Norris et al.

OTHER PUBLICATIONS

Enginnering surfaces, The Timken Company, bulletin, 2004.*

* cited by examiner

*Primary Examiner* — Igor Kershteyn
(74) *Attorney, Agent, or Firm* — Carlson, Gaskey & Olds

(57) ABSTRACT

Roller bearings, and struts and gas turbine engines using such bearings are provided. In this regard, a representative roller bearing for a gas turbine engine includes: a roller having a rolling surface and an end; a race having a flange and defining a raceway, the raceway terminating at the flange, the raceway being operative to receive the roller such that the rolling surface of the roller engages in rolling contact with the raceway; and a hard coating applied to the flange such that the end of the roller engages in sliding contact with the coating.

2 Claims, 1 Drawing Sheet

ROLLER BEARINGS, AND STRUTS AND GAS TURBINE ENGINES HAVING SUCH BEARINGS

BACKGROUND

1. Technical Field

The disclosure generally relates to roller bearings, more particularly to such bearings used in gas turbine engines.

2. Description of the Related Art

Gas turbine engines include numerous rotating and non-rotating components that typically are coupled to each other using bearings. An example of such a bearing is a tapered roller bearing that is commonly used to support a rotating shaft. Notably, a tapered roller bearing can accommodate both radial and axial loads. Unfortunately, bearings such as tapered roller bearings typically are subjected to conditions that cause wear which, if excessive, can lead to premature replacement of the bearings, or failure of the bearings.

SUMMARY

Roller bearings, and struts and gas turbine engines involving such bearings are provided. In this regard, an exemplary embodiment of a roller bearing, e.g., for a gas turbine engine, comprises: a roller having a rolling surface and an end; a race having a flange and defining a raceway, the raceway terminating at the flange, the raceway being operative to receive the roller such that the rolling surface of the roller engages in rolling contact with the raceway; and a hard coating applied to the flange such that the end of the roller engages in sliding contact with the coating.

An exemplary embodiment of a gas turbine engine comprises: a turbine; a shaft operative to be driven by the turbine; and a roller bearing supporting the shaft. The roller bearing comprises: a roller having a rolling surface and an end; a race having a flange and defining a raceway, the raceway terminating at the flange, the raceway being operative to receive the roller such that the rolling surface of the roller engages in rolling contact with the raceway; and a hard coating applied to the flange such that the end of the roller engages in sliding contact with the coating.

An exemplary embodiment of a strut assembly for a gas turbine engine comprises: a strut; and a roller bearing supported by the strut. The roller bearing comprises: a roller having a rolling surface and an end; a race having a flange and defining a raceway, the raceway terminating at the flange, the raceway being operative to receive the roller such that the rolling surface of the roller engages in rolling contact with the raceway; and a hard coating applied to the flange such that the end of the roller engages in sliding contact with the coating.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Roller bearings, and struts and gas turbine engines involving such bearings are provided, several exemplary embodiments of which will be described in detail. In some embodiments, the bearings are used as thrust bearings for gas turbine engines, although other implementations, which may not involve the use of gas turbine engines, are contemplated. Notably, the bearings typically exhibit both rolling and sliding contact between various constituent components of the bearings. In some embodiments, at least one of the component surfaces that experiences sliding contact receives a hard coating.

Figure 1:
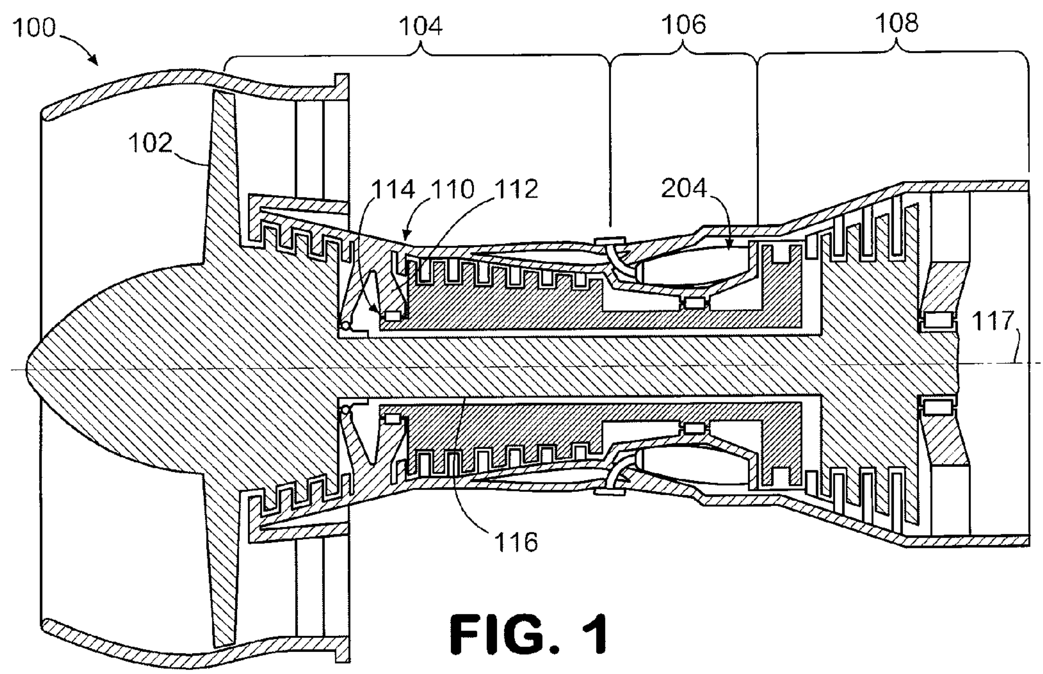
FIG. 1 is a schematic diagram of a representative embodiment of a gas turbine engine.

In this regard, FIG. 1 is a schematic diagram depicting an exemplary embodiment of a gas turbine engine. As shown in FIG. 1, gas turbine engine 100 is configured as a turbofan that includes a fan 102, a compressor section 104, a combustion section 106 and a turbine section 108. Although engine 100 is configured as a turbofan, the concepts described herein should not be construed as being limited to use with turbofans as various other configurations of gas turbine engines can be used, e.g., turbojet, turboprop, unducted fan.

Engine 100 also incorporates a strut assembly 110 that includes a strut 112. Strut 112 is used to support a bearing 114, which engages a shaft 116. In this embodiment, bearing 114 is a thrust bearing and shaft 116 is a low spool shaft that interconnects a low-pressure turbine and low-pressure compressor for driving (either directly or indirectly, e.g., through a gearbox) the fan 102. Shaft 116 extends along a longitudinal axis 117, which defines a centerline of bearing 114. Bearing 114 is described in greater detail with respect to FIG. 2.

Figure 2:
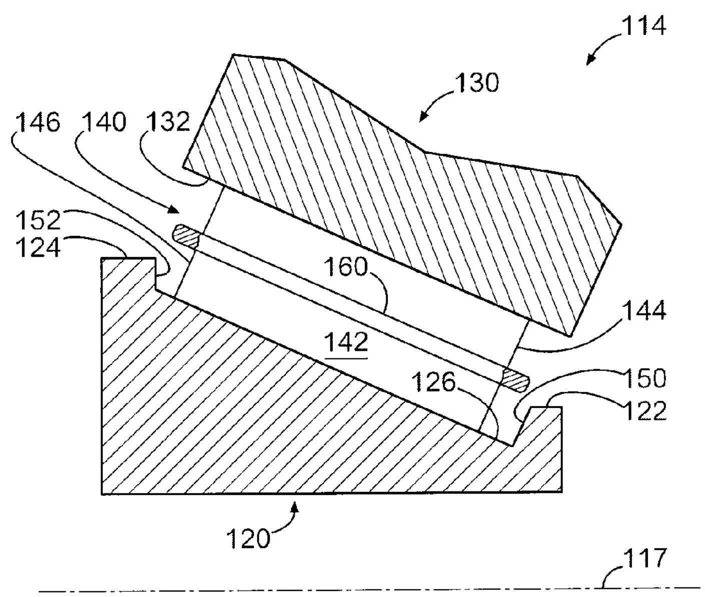
FIG. 2 is a schematic cut-away diagram illustrating the tapered roller bearing of FIG. 1.

As shown in FIG. 2, bearing 114 is a roller bearing, specifically, a tapered roller bearing. Although bearing 114 of FIGS. 1 and 2 is configured as a tapered roller bearing, the concepts described herein should not be construed as being limited to tapered roller bearings as various other roller bearing types can be used.

In FIG. 2, bearing 114 incorporates an inner race 120 and an outer race 130 between which are located rollers. Notably, only one roller (i.e., roller 140) is depicted in FIG. 2, although it should be understood that multiple rollers are located between the races and carried in a spaced arrangement by a cage 160.

Inner race (or "cone") 120 includes an inner flange (or "rib face") 122 and an outer flange 124 between which is defined a raceway 126. Notably, in other embodiments, a cone can incorporate fewer that two rib faces.

Outer race (or "cup") 130 also includes a raceway, in this case, raceway 132. Notably, although outer race 130 does not incorporate flanges, other embodiments can incorporate one or more flanges.

The raceways 126 and 132 are portions of the corresponding races in which rolling surfaces of the rollers engage in rolling contact. By way of example, rolling surface 142 of roller 140 is configured to roll along (engage in rolling contact with) the raceways. In contrast, ends of the rollers are configured to engage in sliding contact with corresponding surfaces of the races. By way of example, ends 144, 146 of roller 140 are configured to engage in sliding contact with corresponding surfaces of race 120. Thus, in the embodiment of FIG. 2, end 144 is configured to engage in sliding contact with flange 122, whereas end 146 is configured to engage in sliding contact with flange 124.

In order to reduce wear of the bearing, the embodiment of FIGS. 1 and 2 incorporates a hard coating that is applied to at least one of the flanges. Specifically, a hard coating is applied to surface 150 of flange 122 and to surface 152 of flange 124. Such a hard coating forms a barrier that tends to reduce scuffing, which can be caused by contact between the flange and an end face of a roller. It should be noted that, in other embodiments, various other surfaces can receive a hard coating. By way of example, one or more of the inner raceway, the outer raceway, an end(s) of a roller and a rolling surface of a roller can be coated. In this regard, in various embodiments, a similar coating can be used on all the components that are to be coated, or two or more of the components can receive different coatings.

With respect to coating types. various hard coatings can be used. By way of example, mineral coatings (such as diamond and/or diamond like coatings), metal coatings (such as nickel coatings), and composite coatings (such as nanocomposite coatings) can be used. For instance, a nanocomposite coating comprising metal carbide in an amorphous hydrogenated carbon matrix (MC/a-C:H) can be used. An example of such a nanocomposite coating is ES300™ by The Timken Company.

Depending upon the application, various considerations can be considered in selection of an appropriate coating. By way of example, one such consideration relates to compatibility with various operating temperatures in gas turbine engines. For instance, compatibility with an operating temperature of approximately 500° F. may be desirable in some applications. Additionally or alternatively, compatibility with synthetic oil, such as MIL-L-23699, can be desired in some applications. Other considerations may include, but are not limited to compatibility with the rib material as being AMS-6278.

Depending upon the type of coating and/or area of intended use, one or more of various application techniques can be used. By way of example, some coatings can be applied, but not limited to sputtering, plating, and electroplating.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A roller bearing comprising:

a roller having a rolling surface and an end;

a race having a flange and defining a raceway, the raceway terminating at the flange, the raceway being operative to receive the roller such that the rolling surface of the roller engages in rolling contact with the raceway;

a hard coating applied to the flange such that the end of the roller engages in sliding contact with the coating;

the hard coating also is applied to a second flange; and the hard coating on second flange is a different hard coating than the hard coating on the first flange.

2. A roller bearing comprising:

a roller having a rolling surface and an end;

a race having a flange and defining a raceway, the raceway terminating at the flange, the raceway being operative to receive the roller such that the rolling surface of the roller engages in rolling contact with the raceway;

a hard coating applied to the flange such that the end of the roller engages in sliding contact with the coating; and a hard coating applied to the end of the roller such that the hard coating applied to the end of the roller engages in sliding contact with the hard coating applied to the flange.

* * * * *